(12) United States Patent
Sparks, Jr.

(10) Patent No.: US 7,717,376 B2
(45) Date of Patent: May 18, 2010

(54) BRACKET DEVICES AND SYSTEMS

(76) Inventor: Douglas M. Sparks, Jr., 67856 151st Ave., Wabasha, MN (US) 55981

( * ) Notice: Subject to any disclaimer, the term of this patent is extended or adjusted under 35 U.S.C. 154(b) by 501 days.

(21) Appl. No.: 11/581,928

(22) Filed: Oct. 17, 2006

(65) Prior Publication Data
US 2008/0087620 A1    Apr. 17, 2008

(51) Int. Cl.
F16B 33/00    (2006.01)
(52) U.S. Cl. .................. 248/145; 248/240; 248/202.1; 248/300; 403/61; 403/403
(58) Field of Classification Search .......... 248/145, 248/229.1, 229.2, 235, 202.1, 200, 300, 240, 248/296.1; 211/182, 189, 103, 175, 191, 211/192; 403/61, 109.6, 116, 403, 3, 4, 382
See application file for complete search history.

(56) References Cited
U.S. PATENT DOCUMENTS

| 2,123,695 | A | * | 7/1938 | Elmer .................. 248/230.2 |
| 3,637,087 | A | | 1/1972 | Denny |
| 3,871,784 | A | * | 3/1975 | Van Horn .................. 403/236 |
| 4,113,109 | A | * | 9/1978 | Donnelli et al. ............ 211/49.1 |
| 4,120,250 | A | | 10/1978 | Viessmann |
| 4,142,638 | A | | 3/1979 | Vargo |
| 5,289,665 | A | * | 3/1994 | Higgins .................. 52/655.1 |
| 5,350,073 | A | | 9/1994 | Thornley et al. |
| 6,109,461 | A | * | 8/2000 | Kluge et al. ............ 211/90.01 |
| 6,719,481 | B2 | * | 4/2004 | Hoffmann .................. 403/403 |
| 6,929,227 | B2 | * | 8/2005 | Hofmann et al. ......... 248/224.8 |
| 2005/0103734 | A1 | | 5/2005 | Saltzberg et al. |

* cited by examiner

Primary Examiner—Anita M King
(74) Attorney, Agent, or Firm—Brooks, Cameron & Huebsch, PLLC

(57) ABSTRACT

The present disclosure includes a number of device and system embodiments. One such bracket device embodiment includes a coupling segment having two coupling legs for connecting to a first support member and a mounting segment having two mounting legs for connecting to a second support, and wherein the mounting legs are arranged to be oriented in an opposite direction relative the coupling legs when attached to the second support, the mounting legs perpendicular in one axial dimension to the coupling legs.

33 Claims, 6 Drawing Sheets

BRACKET DEVICES AND SYSTEMS

FIELD OF THE DISCLOSURE

The present disclosure relates generally to bracket devices and systems; and more particularly to bracket devices and systems for joining supporting and supported members of structures.

BACKGROUND

Frame structures that are used for supports, stands, display apparatus, racks, carts, or workstations often utilize a plurality of frame members which are attached together perpendicularly where certain frame members constitute vertical frame portions and other frame members constitute horizontal frame portions.

There are many existing ways to attach the frame members to one another. Where permanent structures are envisioned, permanent techniques of fastening are used such as welding, gluing, or nailing. In structures which are not intended to be permanent, techniques such as bolting, interfitting projections and slots, bendable metal tabs, and the like have been used.

A common drawback of non-permanent structures is that the devices are limited in that the number of points of attachment is restricted, and the structure is oftentimes predetermined for one configuration and cannot be used for multiple uses based on the configuration chosen.

DETAILED DESCRIPTION OF THE DISCLOSURE

Figure 1A:
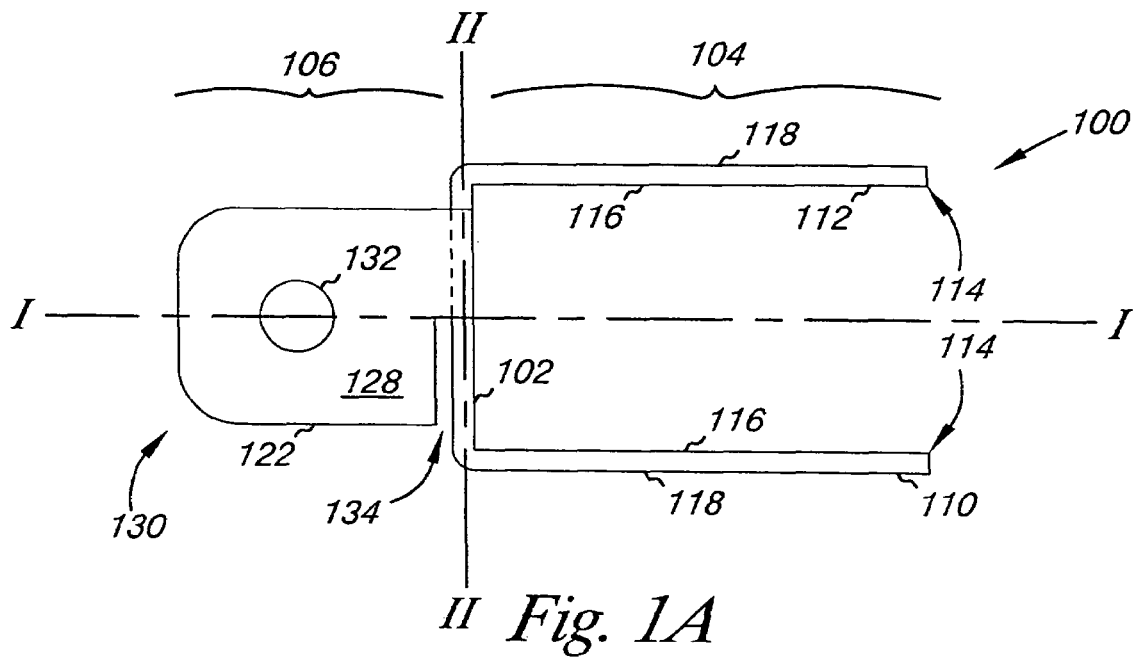
FIG. 1A is a front elevation view of an embodiment of a bracket device according to the present disclosure.

Embodiments of the present disclosure are directed to devices and systems for joining a number of support members together to form entire structures or portions thereof. As used herein, structures can include shelves, racks, carts, workstations, containers, benches, and any other structure that can be constructed using embodiments of the present disclosure.

According to the present disclosure, there are several applications that may benefit from the devices and systems as described herein. Such applications include constructing structures without tools or through use of a minimal number of tools. Such embodiments may provide individuals that are not handy with tools, the ability to create structures or portions thereof.

In addition, embodiments of the present disclosure may be useful to make structures that can be assembled and disassembled without damaging the support members of the structure. Such embodiments allow the support members to be reused and/or reconfigured into different structures or portions thereof.

Further, embodiments of the present disclosure may be useful when constructing a structure for a specific purpose, such that the structure can be designed and constructed to fit the purpose. Such embodiments can be designed to have a number of similar parts thereby allowing the parts to be used in a variety of configurations.

Various embodiments of the present disclosure provide a double U-shaped bracket. As used herein, "double U-shaped" refers to a bracket with two opposite facing U-shape members, where the legs of the two "U"s extend in opposite directions. In some embodiments, a double U-shaped bracket is a bracket with four legs, where two legs are fixed to a surface in one direction, and the other two legs are fixed to the surface in the opposite direction. Such double U-shaped brackets can give flexibility in the construction of structures, in some embodiments, since double U-shaped brackets can be affixed to a variety of surfaces and can be affixed in a number of ways, as discussed herein.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments of value. In addition, discussion of features and/or attributes for an element with respect to one figure can also apply to the element shown in one or more additional figures. Additionally, embodiments of the devices and systems may have different dimensions than those illustrated in the figures.

Figure 1B:
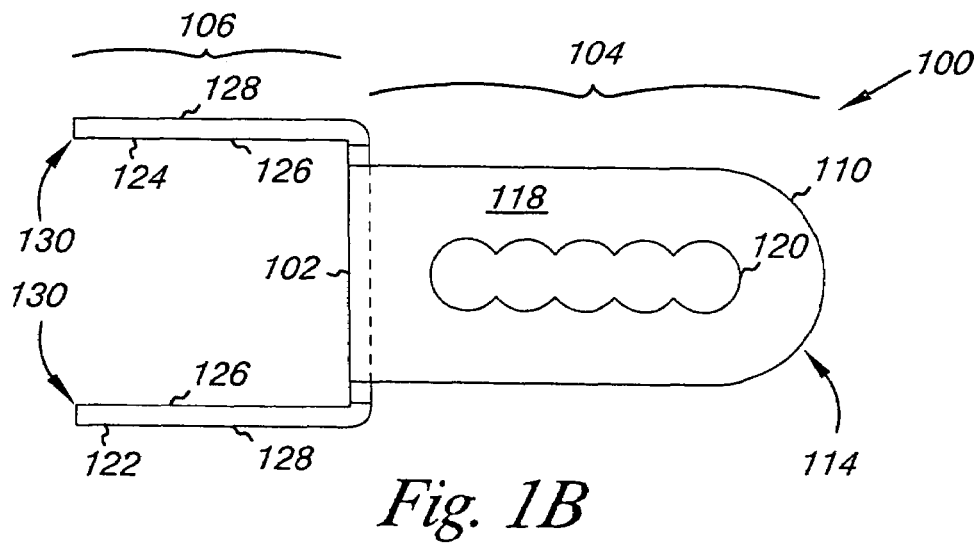
FIG. 1B is a side elevation view of the embodiment of FIG. 1A.
Figure 1C:
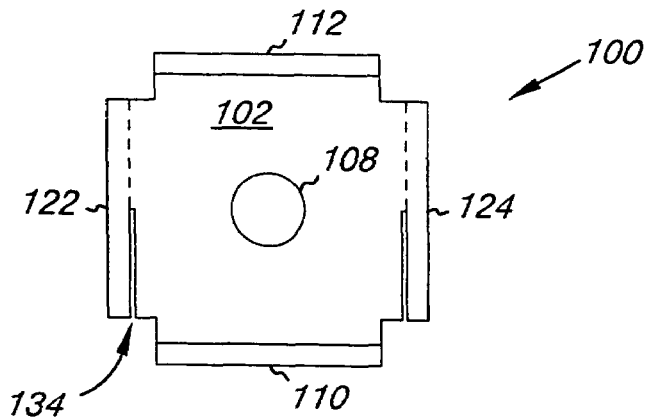
FIG. 1C is a top elevation view of the embodiment of FIG. 1A.

FIGS. 1A-1C provide an illustration of a bracket 100 according to the present disclosure. FIG. 1A is a front elevation view of a bracket 100. FIG. 1B is a side elevation view of the bracket 100 when the bracket 100 has been rotated ninety (90) degrees around the axis I-I relative to the position shown in FIG. 1A. FIG. 1C is a top elevation view of the bracket 100 when the bracket 100 shown in FIG. 1A has been rotated ninety (90) degrees around the axis II-II toward the viewer.

The embodiment FIG. 1A includes a bracket 100 having a connecting member 102, a coupling segment 104, and a mounting segment 106. In various embodiments, the connecting member can be integrally formed with either or both the coupling segment and the mounting segment. As illustrated in the embodiment of FIG. 1A, the coupling segment can include a number of coupling legs (e.g., a first leg 110 and a second leg 112).

In various embodiments, the coupling segment 104 and/or the mounting segment 106 can be U-shaped brackets each having two legs. In some embodiments, the coupling segment 104 and the mounting segment 106 can be formed separately and joined so as to form the connecting member 102. The mounting segment 106 and coupling segment 104 can be joined by laser welding, chemical adhesion, or other such processes.

In the embodiment illustrated in FIG. 1A, the connecting member is connected to both the coupling segment 104 and the mounting segment 106. The embodiment of FIG. 1A also illustrates the coupling segment 104 as having multiple coupling legs (e.g., legs 110 and 112). The coupling legs each have a first surface 116, a second surface 118, and an end 114.

The embodiment of FIG. 1A also illustrates the mounting segment 106 as having a number of legs. (e.g., only leg 122 is illustrated in FIG. 1A, while legs 122 and 124 are both illustrated in FIG. 1B due to the orientation of the illustrations). The mounting segment 106 provided in the embodiment of FIG. 1A also includes a third surface 128, an end 130, an aperture 132, and a slit 134. Such features will be described in more detail below.

For instance, in various embodiments, the coupling legs can extend from one or more connecting members. For example, in the embodiment of FIG. 1A, the coupling legs 110, 112 extend from the connecting member 102. In addition, in some embodiments, the coupling legs can extend from the connecting member in the same direction, but from opposite sides of the connecting member. In various embodiments, the coupling legs can extend from adjacent sides of the connecting member. Some embodiments can include legs having different lengths.

The coupling legs can extend in various directions with respect to the connecting member. For example, as illustrated in FIG. 1A the coupling legs 110, 112 can extend from the connecting member 102 at a ninety (90) degree angle relative to the connecting member 102.

In some embodiments the coupling legs can extend from the connecting member at angles greater than ninety (90) degrees, or the coupling legs can extend from the connecting member at angles less than ninety (90) degrees relative to the connecting member. In addition, in the embodiment shown in FIG. 1A, the coupling legs 110, 112 extend from the connecting member 102 at an angle that is approximately equal. In various embodiments, the coupling legs can extend from the connecting member at different angles relative to the connecting member.

In some embodiments, the coupling legs and the connecting member are formed at the same time as one piece of material. In such embodiments, the coupling legs can, for example, be bent to a position out of plane with the connecting member so that the coupling legs extend from the connecting member.

In various embodiments, the coupling legs can be formed separately from the connecting member and attached to the connecting member by laser welding, chemical adhesion, or other suitable processes. In some embodiments, the coupling legs can be formed of a different material than the connecting member and attached to the connecting member by laser welding, chemical adhesion, or other suitable processes.

As stated above, various embodiments of the present disclosure also include a mounting segment having a number of mounting legs thereon. The mounting legs of the various embodiments disclosed herein can include any suitable end shapes, such as curved ends, squared ends, ends with angles formed thereon, and irregularly shaped ends, among others. For example, in the embodiment of FIG. 1A, the mounting leg 122 has a proximal end 130 that has rounded corners.

In some embodiments, the mounting legs can extend from the connecting member. In addition, in some embodiments, such as that illustrated in FIG. 1A, the mounting legs 122, 124 can extend from the connecting member 102 in the same direction, but from opposite sides of the connecting member 102, so that the third surface 126 on the mounting leg 122 faces the third surface 126 on the mounting leg 124 (as illustrated in FIG. 1B). In various embodiments, the mounting legs can extend from adjacent sides of the connecting member.

In some embodiments, such as that illustrated in FIG. 1A, the third mounting leg 122 can have a slit 134 at the junction between the connecting member 102 and the third mounting leg 122. In some embodiments, the slit 134 can extend from a top of the junction between the connecting member 102 and the mounting leg 122 to approximately the middle of the junction between the connecting member 102 and the mounting leg 122.

In various embodiments, the slit can be an opening defined by the junction between the connecting member and a mounting leg. In some embodiments, the mounting leg can have a slit. In yet another embodiment, both mounting legs can have slits at the junctions between the connecting member and the mounting legs and/or on the mounting legs. The slit can be formed by stamping, laser cutting, or drilling, among other manners.

The coupling legs of the various embodiments disclosed herein can include any suitable end shapes, such as curved ends, squared ends, ends with angles formed thereon, and irregularly shaped ends, among others. For example, in the embodiment of FIG. 1B, the coupling legs 110, 112 can have a distal end 114 that is rounded. In other embodiments, the coupling legs 110, 112 can have a distal end 114 with a polygonal shape. Further, in some embodiments, the coupling legs can have dissimilar shapes on the distal end.

In addition, as shown in the embodiment of FIG. 1A and FIG. 1B, the coupling legs 110, 112 can have a first surface 116 and a second surface 118 that define a coupling leg opening 120 aligned across the connecting member 102. In some embodiments, the coupling leg opening can be a series of overlapping, circular openings. In some embodiments, the coupling leg opening can be a long, straight, narrow opening. In various embodiments, the coupling leg opening can be a series of overlapping polygonal openings.

The coupling leg opening can be of any suitable shape, including, but not limited to single or multiple circular, oval, or polygonal openings. The coupling leg opening can be formed, for example, by stamping or drilling, among other manners.

The embodiment of FIG. 1B also illustrates a mounting segment 106, as discussed herein. In various embodiments, the mounting segment can be a U-shaped bracket with two legs and the connection member can be provided as the intermediary between the two legs.

As illustrated in the embodiment of FIG. 1B, the mounting segment can include multiple mounting legs (e.g., a third leg 122 and a fourth leg 124), extending from the connecting member 102 in an opposite direction relative the first and second legs 110, 112. In some embodiments, such as that illustrated in FIG. 1B, the mounting legs 122, 124 can have a third surface 126 and a fourth surface 128. In such embodiments, the mounting legs 122, 124 can extend from the connecting member 102 such that the third surface 126 and fourth surface 128 of the mounting legs 122, 124 are perpendicular to the first surface 116 and second surface 118 of the coupling legs 110, 112, respectively.

As illustrated in FIG. 1B, in some embodiments, the mounting legs 122, 124 can extend from the connecting member 102 at a ninety (90) degree angle relative the connecting member 102. In other embodiments the mounting legs 122, 124 can extend from the connecting member 102 at varying angles similar to those embodiments discussed herein for the coupling legs 110, 112. In other embodiments, the mounting legs 122, 124 can extend from the connecting member 102 at different angles relative the connecting member 102.

In some embodiments, the mounting legs 122, 124 and the connecting member 102 are formed at the same time as one piece of material. In this embodiment, the mounting legs 122, 124 can be bent to a position out of plane with the connecting member 102 so that the mounting legs 122, 124 extend from the connecting member 102. In an additional embodiment, the mounting legs 122, 124 can be formed separately from the connecting member 102 and attached to the connecting member 102 by laser welding, chemical adhesion, or the like. In some embodiments, the mounting legs 122, 124 can be formed of a different material than the connecting member 102 and attached to the connecting member 102 by laser welding, chemical adhesion, or the like.

In addition, as shown in FIG. 1A and FIG. 1B, the mounting legs 122, 124 can include a third surface 126 and a fourth surface 128 that define a mounting leg aperture 132 aligned across the connecting member 102. In some embodiments, the mounting leg aperture 132 can be circular, oval, or polygonal. The mounting leg aperture 132 can be formed by stamping, drilling, or the like.

As illustrated in FIG. 1C, the connecting member 102 can be rectangular with a connecting aperture 108 in the center. In other embodiments the connecting member 102 can be circular, oval, triangular, or other shapes. In addition, in some embodiments the connecting aperture 108 can be rectangular, oval, circular, triangular, polygonal, or the like. In yet another embodiment, the connecting aperture 108 is near a side of the connecting member 102. The connecting aperture 108 can be formed by drilling, stamping, or the like to obtain a uniform connecting aperture 108 through the connecting member 102.

The bracket 100, as illustrated in FIGS. 1A-1C can be made of many different materials. In some embodiments, the bracket can be made of a metal and/or metal alloy. Examples of such metals/metal alloys include, but are not limited to, platinum, titanium, stainless steel (e.g., 316L stainless steel), aluminum, copper, and gold. In some embodiments, the bracket can be made of a polymer, such as polyvinyl chloride (PVC), high density polyethylene (HDPE), low density polyethylene (LDPE), or the like. The bracket can also be made of wood, and/or fiberglass. Embodiments can also be made of other suitable materials for forming the devices or systems discussed herein.

The connecting legs 110, 112 and mounting legs 122, 124 can be made of different materials than each other and/or the connecting member 102. In these embodiments, the legs 110, 112, 122, 124 can be attached to the connection member 102 using chemical adhesion, laser welding, or the like.

Figure 2:
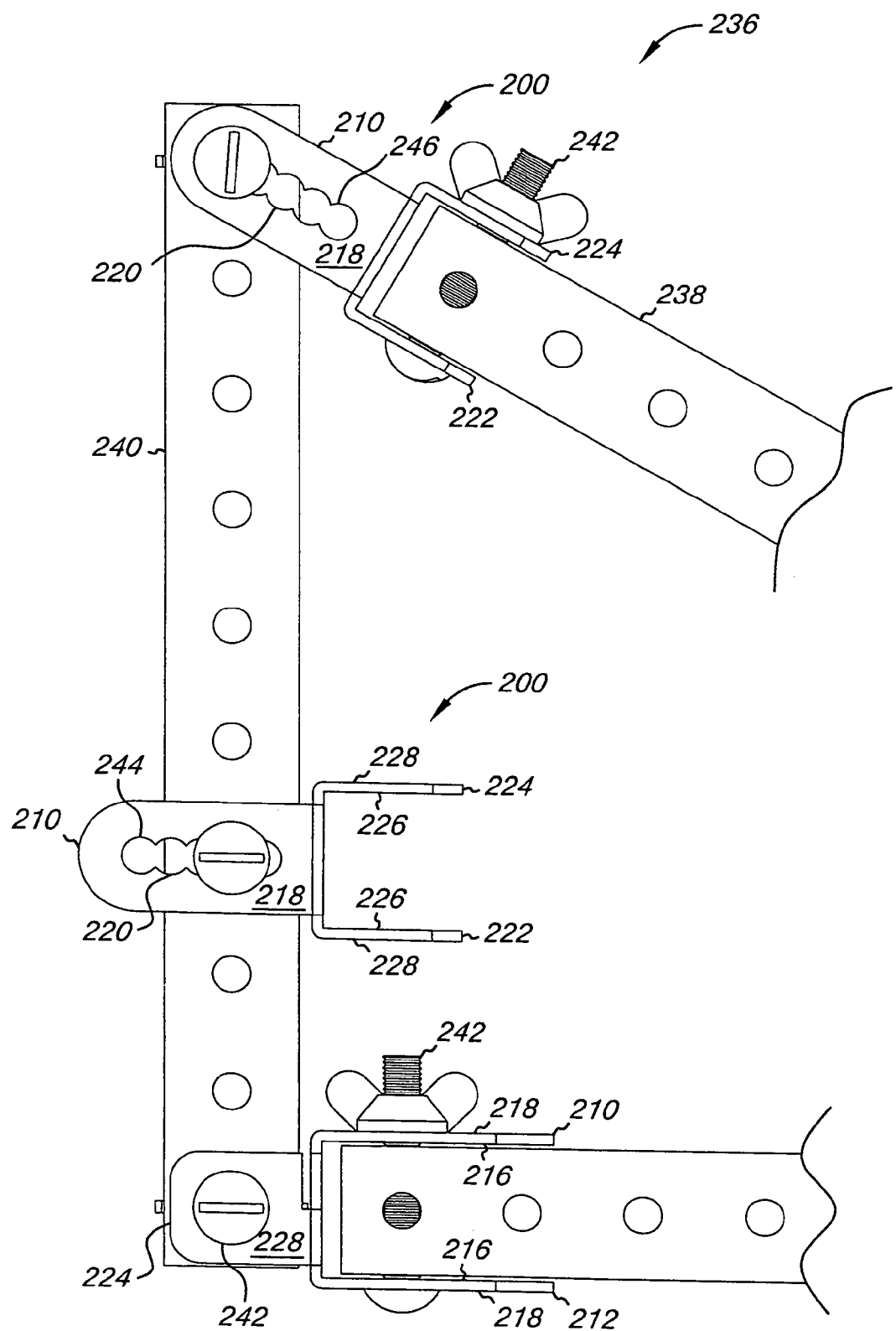
FIG. 2 illustrates an embodiment of a system according to the present disclosure having a number of bracket devices.

FIG. 2 provides an illustration of a system according to the present disclosure. The system 236 includes a first support member 238 and a second support member 240. In some embodiments, the first and second support members 238, 240 can include one or more apertures. The apertures can be formed by punching or drilling into the walls of the support members 238, 240. In some embodiments, the first support member 238 and second support member 240 can be made of the same material. In other embodiments, the first and second support member 238, 240 can be made of different materials. Exemplary materials for the first and second support members 238, 240 include, but are not limited to, metals such as steel, iron, aluminum and the like; plastics, such as polyvinyl chloride, and the like, or wood, among other suitable materials.

The support members can have any suitable shape. For example, the support members can have a polygonal cross-sectional shape such as a square or rectangle. In some embodiments, the first and second support members can have a circular or elliptical cross-sectional shape.

In addition, a support member can have a predefined profile that matches the distance between the first and second legs of a double U-shaped bracket. In some embodiments, a support member can have a profile that matches the distance between the third and fourth legs of a double U-shaped bracket.

Further, in various embodiments, the support members can have similar or identical profiles. In such embodiments, the support members can be interchangeable when being attached to of the legs of a double U-shaped bracket.

FIG. 2 illustrates an embodiment of the system including an attachment arrangement where the second support member is attached to the first support member so that the second support member can extend approximately perpendicular relative to the first support member. As illustrated in the embodiment of FIG. 2, the first and second support members 238, 240 can be attached using a double U-shaped bracket 200.

As discussed herein, and as illustrated in FIG. 2, the first and second legs 210, 212 of the double U-shaped bracket 200 can have a first surface 216 and second surface 218 that define a coupling leg opening 220. To attach the double U-shaped bracket 200 to the first support member 238, the first surface 216 of the first and second legs 210, 212 is contacted with opposite side faces of the first support member 238.

In such embodiments, the first and second legs 210, 212 are positioned so that the coupling leg openings 220 on the first and second leg 210, 212 are aligned with the aperture provided on the first support member 238. In some embodiments, the first and second legs are secured to the first support member using an attachment member for connection of the double-U shaped bracket and the first support member.

As illustrated in FIG. 2, in some embodiments, the attachment member 242 can be a screw and a wing nut, among other suitable attachment mechanisms. Other suitable attachment mechanisms include, but are not limited to, pins, nuts and bolts, screws, hook and loop fasteners, ties, wire, adhesives, welding, and other types of fastening mechanisms. As some of the above would not be utilized with an aperture, it is understood that some embodiments may not have an aperture for placement of an attachment member.

In the embodiment illustrated in FIG. 2, the attachment of the double U-shaped bracket 200 and the first support member 238 can be performed by hand, without the use of tools. In some embodiments, the attachment member 242 can be a wooden dowel formed slightly larger than the coupling leg openings 220 and the diameter of the aperture provided on the first support member 238.

In such an embodiment, the dowel can be pushed through the coupling leg openings and the aperture provided on the first support member to secure the double U-shaped bracket to the first support member. In other such embodiments, the attachment member can be a metal rod, a plastic rod, or the like. Such embodiments can also include securing mechanisms such as detents on the attachment member and/or on the aperture and/or opening to maintain the attachment member in place.

In addition, the attachment member can be made of several different materials. In some embodiments, the attachment member can be made of a metal and/or metal alloy, such as steel, iron, aluminum, titanium, copper, or the like. The attachment member can also be made of synthetic materials, such as polyvinyl chloride, high density polyethylene, polyethylene, or butadiene-polyamide copolymer, among others. The attachment member can also be made of other natural or synthetic materials such as wood and/or fiberglass.

The embodiment of FIG. 2 illustrates a second support member 240 that is attached to the first support member 238 so that the second support member 240 can extend approximately perpendicular relative to the first support member 238.

To attach the double U-shaped bracket 200 to the second support member 240, as illustrated in FIG. 2, the third surface 226 of the third and fourth legs 222, 224 can be contacted with opposite side faces of the second support member 240. The third and fourth legs 222, 224 are positioned so that the mounting leg apertures 232 on the third and fourth leg 222, 224 are aligned with the aperture provided on the second support member 240. In some embodiments, the third and fourth legs 222, 224 are secured to the second support member 240 using an attachment member 242 for connection of the double-U shaped bracket 200 and the second support member 240, as discussed herein.

As discussed herein, in some embodiments, the coupling leg opening can be a series of overlapping openings (e.g., circular openings). In such embodiments, the distance between the first and second support members can be adjustable. For example, in some embodiments, the distance between the first and second support members can be maximized when the first and second support members are attached to the double U-shaped bracket as discussed herein. In such embodiments, the first leg and the second leg can be secured to opposite side faces of the first support member using an attachment member by aligning the aperture on the first support member with the most distal portion of the openings of the coupling leg opening on the first and second legs.

In such embodiments, the distance between the first and second support members can also be minimized. In such embodiment, the first leg and the second leg can be secured to opposite side faces of the first support member using an attachment member by aligning the aperture on the first support member with the most proximal portion of the opening of the coupling leg openings on the first and second legs. In various embodiments, the distance between the first and second support members can be determined by which circular opening of the coupling leg opening on the first and second legs is aligned with the aperture on the first support member.

In some embodiments, as discussed herein, the connecting member has a connecting aperture in the center of the connecting member. For example, in the embodiment of FIG. 2, the connecting member 202 of the double U-shaped bracket 200 can be secured to the first support member 238 using an attachment member 242 at the aperture provided on the first support member 238 and the connecting aperture 208. As illustrated in the embodiment of FIG. 2, the connecting member 202 of the double U-shaped bracket 200 can be secured to the second support member 240 using an attachment member 242 at the aperture provided on the second support member 240 and the connecting aperture 208.

Figure 3A:
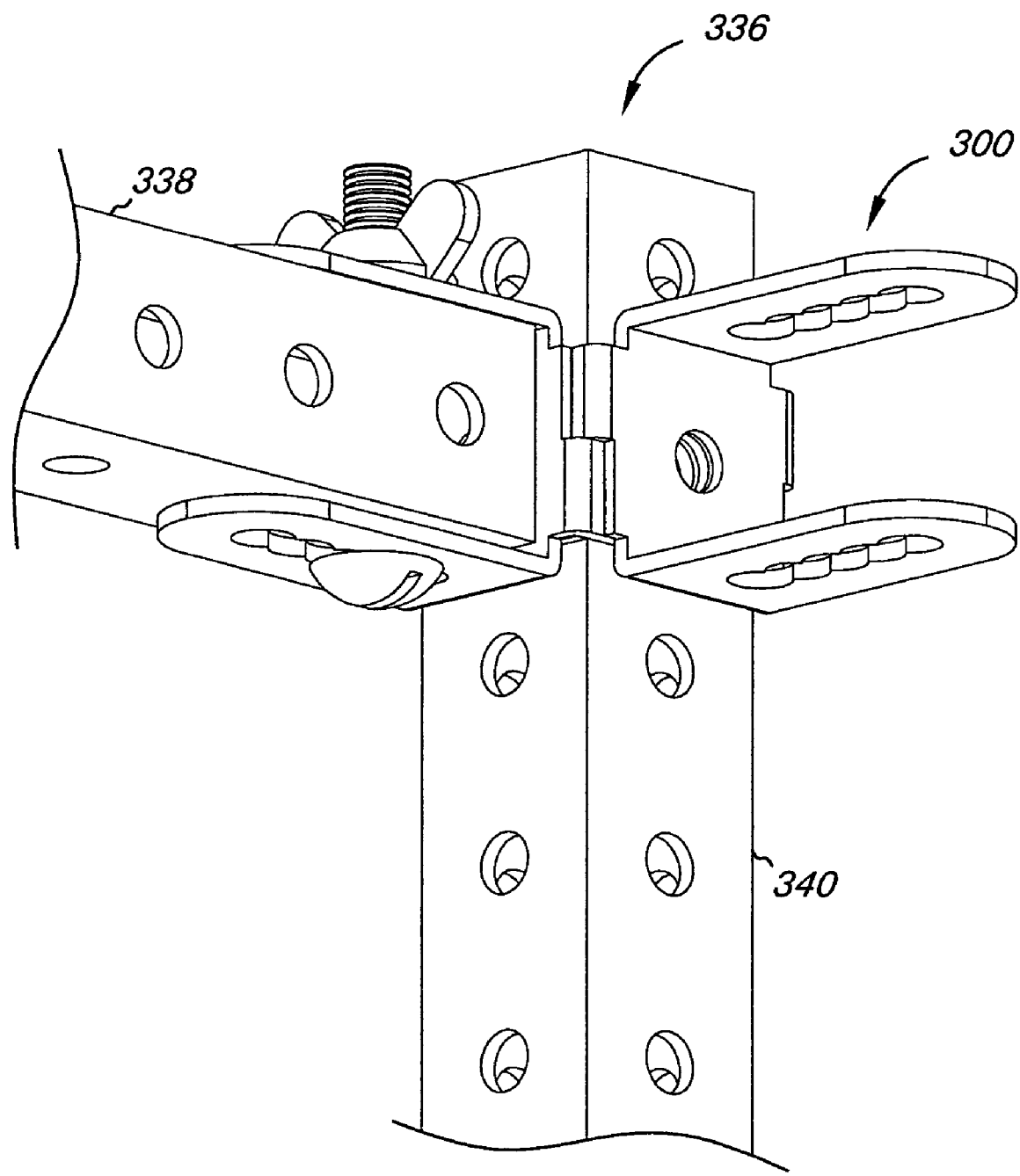
FIG. 3A illustrates an embodiment of a system according to the present disclosure.
Figure 3B:
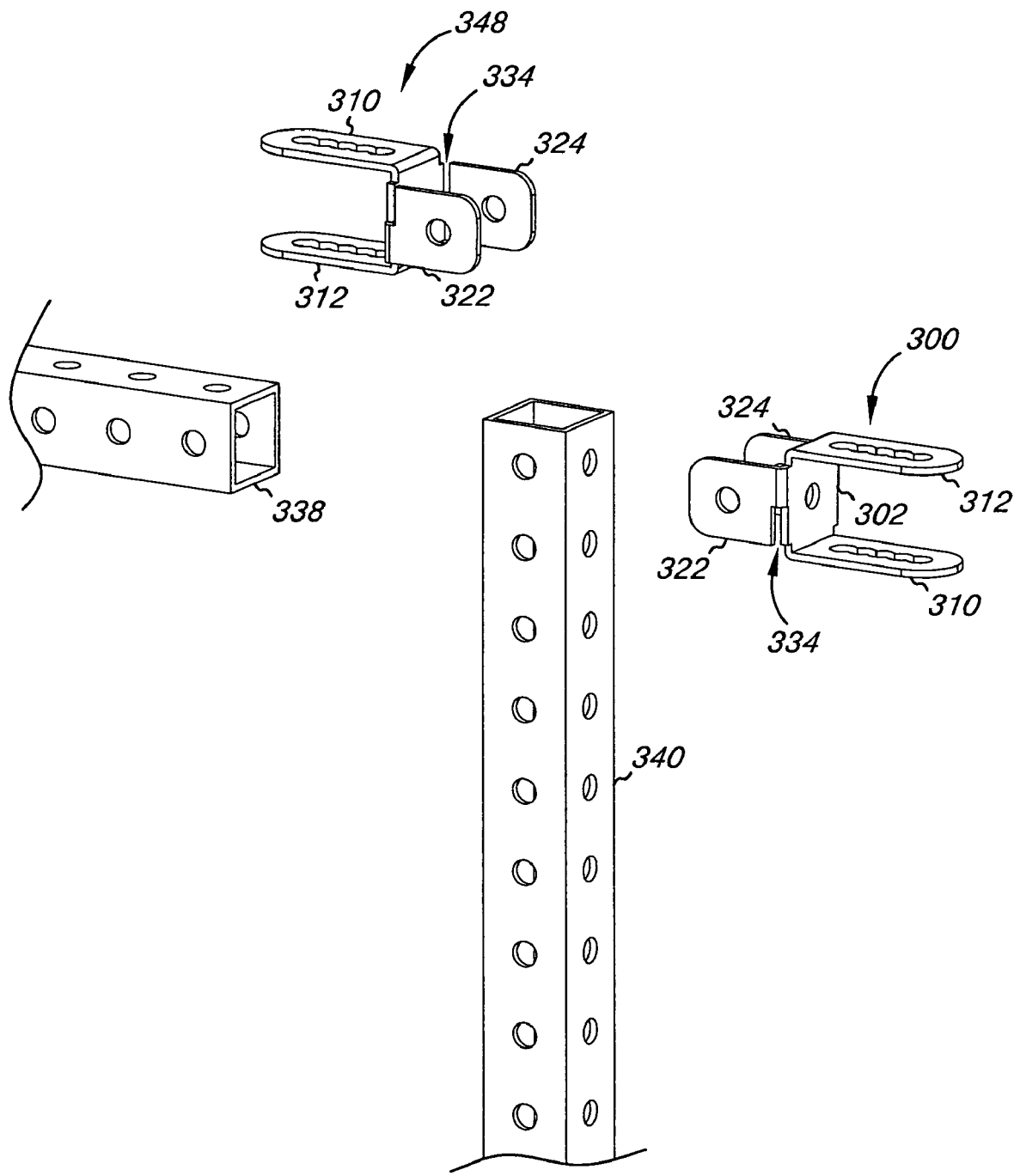
FIG. 3B is an exploded illustration of the embodiment shown in FIG. 3A.

FIGS. 3A and 3B illustrate a system embodiment of the present disclosure. FIG. 3A illustrates a view of a system 336, and FIG. 3B illustrates an exploded view of the system 336 of FIG. 3A. In some embodiments, such as that illustrated in FIG. 3A, the third leg 322 of the double U-shaped bracket 300 can have a slit 334 at the junction between the connecting member 302 and the third leg 322. In some embodiments, the slit can extend from the top of the junction to approximately the middle of the junction between the connecting member and the third leg.

In some embodiments, such as that illustrated in FIG. 3A, the system 336 can include a second double U-shaped bracket 348 that is inverted relative to the first double U-shaped bracket 300. In such embodiments, the second double U-shaped bracket can have a third leg with a slit extending from the top to the middle of the junction between the connecting member and the third leg.

In various embodiments, including the embodiment illustrated in FIG. 3A, the third and fourth legs 322, 324 of the second double U-shaped bracket 348 can be secured to opposite side faces of the second support member 340. The first double U-shaped bracket 300 can also have the third and fourth legs 322, 324 secured to the second support member 340 by interlocking the third leg slit 334 of the first double U-shaped bracket 300 with the inverted third leg slit 334 of the second double U-shaped bracket 348. In such embodiments, both the first and second double U-shaped brackets 300, 348 can have first and second legs 310, 312 attached to separate first support members 338. In some embodiments, the separate first support members 338 can extend from the second support member 340 at approximately a ninety (90) degree angle relative to each other.

In some embodiments, the first and second double U-shaped brackets can have both third and fourth legs with slits extending from the top to the middle of the junction between the connecting member and the third and fourth legs. In such embodiments, an additional double U-shaped bracket can be inverted and attached to the second support member by interlocking the fourth leg slit on the first double U-shaped bracket (e.g., 300) with the inverted fourth leg slit on the additional double U-shaped bracket. Additional configurations are also possible, including the addition of multiple U-shaped brackets.

Figure 4A:
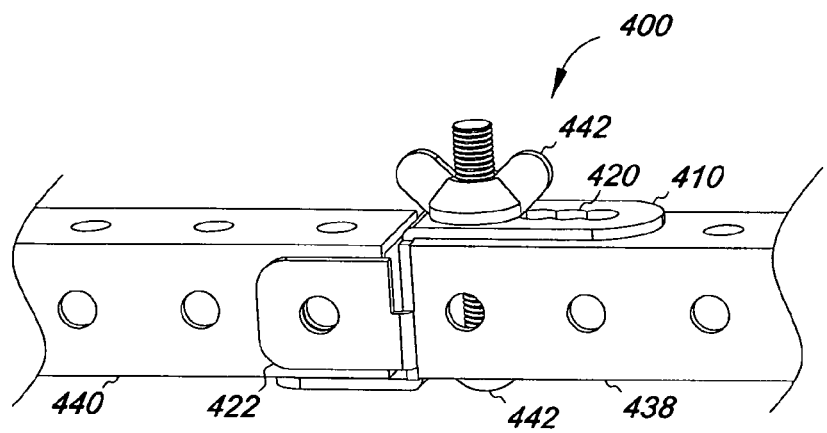
FIG. 4A is an illustration of an embodiment of a system according to the present disclosure.
Figure 4B:
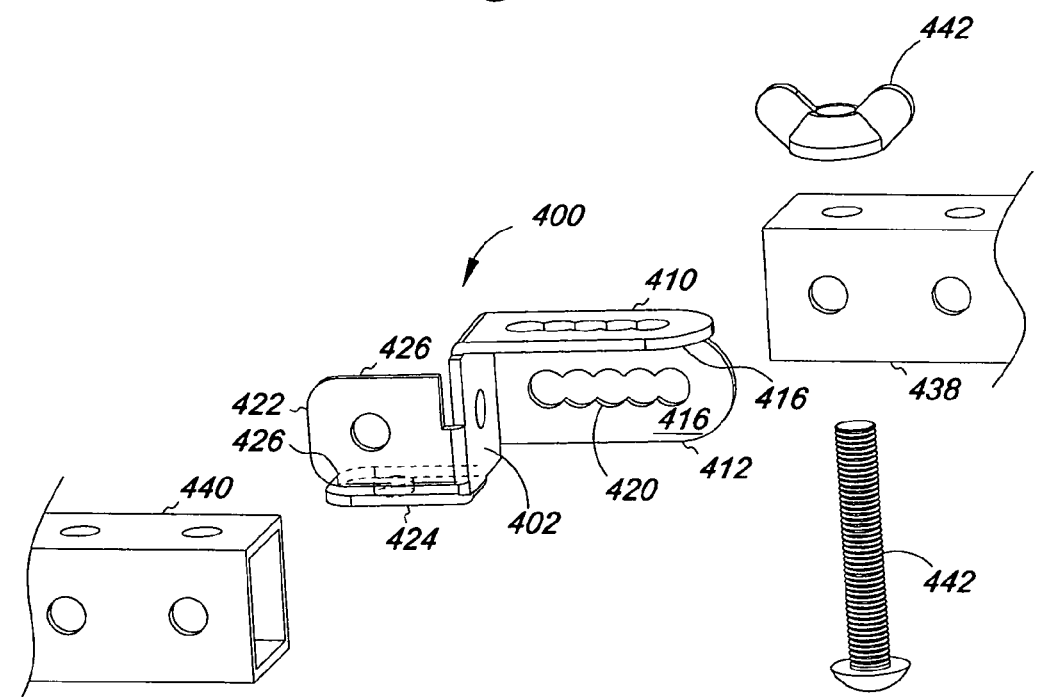
FIG. 4B is an exploded illustration of the embodiment shown in FIG. 4A.

FIGS. 4A and 4B illustrate another system embodiment according to the present disclosure. FIG. 4B is an exploded view of FIG. 4A. As discussed herein, in some embodiments, such as that illustrated in FIG. 4A, the first and second legs 410, 412 extend from adjacent sides of the connecting member 402.

In addition, in such an embodiment, the third and fourth legs 422, 424 can extend from adjacent sides of the connecting member 402 in the opposite direction of the first and second legs 410, 412. As illustrated in FIG. 4A, the legs 410, 412, 422, 424 can be positioned such that the first surface 416 of the first leg 410 is perpendicular to the third surface 426 of the third leg 422, and the first surface 416 of the second leg 412 is perpendicular to the third surface 426 of the fourth leg 424.

The embodiment of FIG. 4A also illustrates that the double U-shaped bracket 400 can be used to attach the second support member 440 to the first support member 438 so that the second support member 440 can extend in the opposite direction relative to the first support member 438. In some embodiments, the first and second legs 410, 412 are secured to adjacent side faces of the first support member 438 using an attachment member 442, as illustrated in FIG. 4A, for connection of the double U-shaped bracket 400 and the first support member 438.

The double U-shaped bracket 400 and the first support member 438 can be attached at the aperture provided on the first support member 438 and the first and second leg 410, 412 openings 420. Further, the third and fourth legs 422, 424 can be secured to adjacent side faces of the second support member 440 using an attachment member 442, as discussed herein, for connection of the double U-shaped bracket 400 and the second support member 440. In various embodiments, the double U-shaped bracket and the second support member can be attached at the aperture provided on the second support member and the third and fourth leg apertures.

Figure 5A:
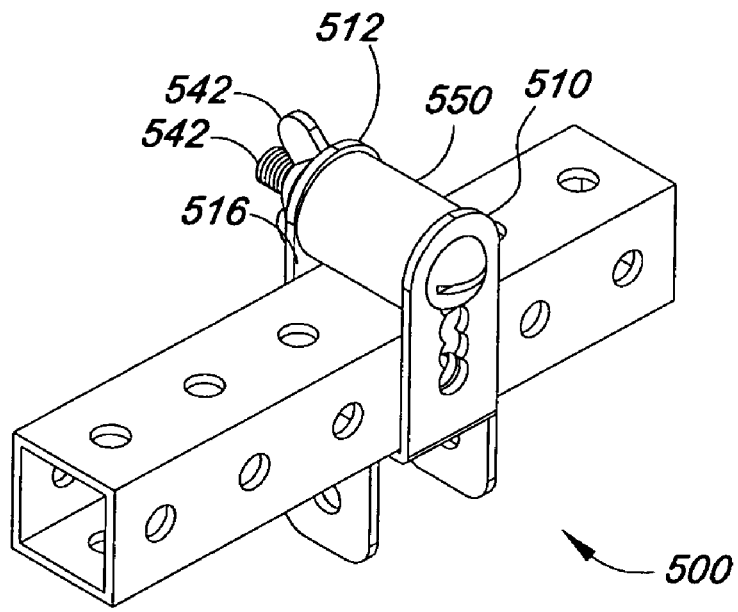
FIGS. 5A and 5B show an embodiment of the bracket device according to the present disclosure including a wheel.
Figure 5B:
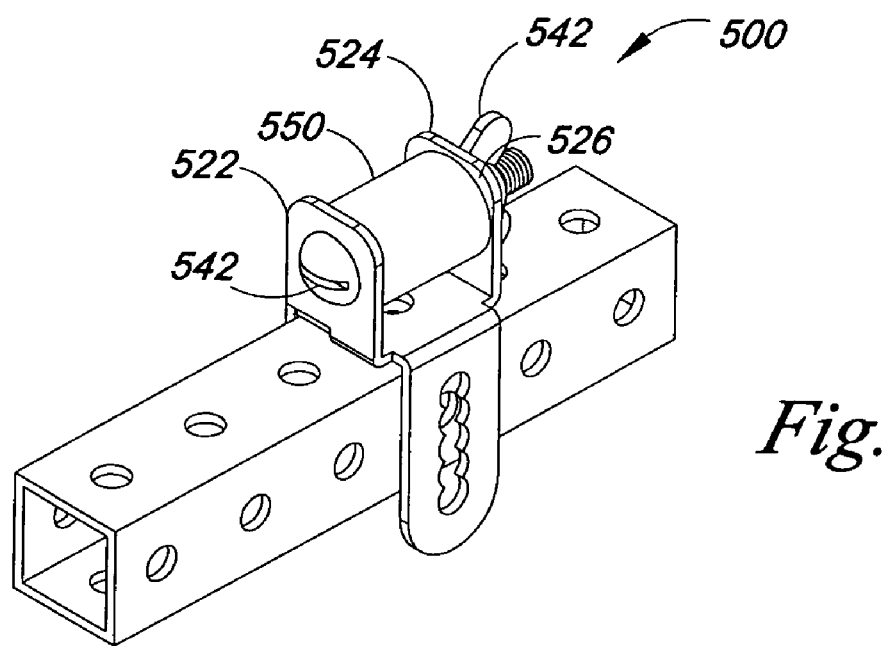

FIGS. 5A and 5B show an embodiment of a double U-shaped bracket 500 including a wheel 550. The wheel 550 can be attached to the double U-shaped bracket by attaching the wheel 550 to the double U-shaped bracket 500 with an attachment member 542. FIG. 5A illustrates an embodiment, where the wheel 550 can be attached to the double U-shaped bracket 500 between the first major surfaces 516 of the first leg 510 and second leg 512.

In another embodiment, the wheel 550 can be attached to the double U-shaped bracket 500 between the third major surfaces 526 of the third leg 522 and fourth leg 524. In addition, in some embodiments, the wheel 550 can be equipped with a locking mechanism to lock the wheel 550 to prevent the wheel 550 from rolling. The wheel 550 can be made from various materials, including wood, plastic, and/or metal, among other suitable materials.

Embodiments of the present disclosure are not meant to be limited to the use of a wheel 550 with the double U-shaped bracket 500. Other objects could also be used in place of the wheel 550 including, but not limited to, pegs, brackets, and/or shelving.

Although specific embodiments have been illustrated and described herein, those of ordinary skill in the art will appreciate that an arrangement calculated to achieve the same techniques can be substituted for the specific embodiments shown. As one of ordinary skill in the art will appreciate upon reading this disclosure, various embodiments of the invention can be performed in one or more devices, device types, and system environments including networked environments.

Combination of the above embodiments, and other embodiments not specifically described herein will be apparent to those of skill in the art upon reviewing the above description. The scope of the various embodiments of the disclosure includes other applications in which the above structures and methods can be used. Therefore, the scope of various embodiments of the disclosure should be determined with reference to the appended claims, along with the full range of equivalents to which such claims are entitled.

In the foregoing Detailed Description, various features may have been grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A bracket device, comprising:
   a coupling segment having two coupling legs for connecting to a first support member; and
   a mounting segment having two mounting legs for connecting to a second support member, wherein the mounting legs are arranged to be oriented in an opposite direction relative the coupling legs when attached to the second support member, the mounting legs perpendicular in one axial dimension to the coupling legs, and wherein a mounting leg has a slit at a junction between a connecting member positioned between the coupling segment and the mounting segment and the mounting leg, the slit configured for interlocking with a leg slit of a different mounting segment;
   wherein the two coupling legs extend from the connecting member and the connecting member has a connecting aperture in the center of the connecting member.

2. The bracket device of claim 1, wherein the two coupling legs each have a coupling leg opening aligned across the connecting member.

3. The bracket device of claim 2, wherein the coupling leg opening is a series of overlapping, circular openings.

4. The bracket device of claim 3, wherein the mounting legs extend from the connecting member and each mounting leg defines a mounting leg aperture aligned across the connecting member.

5. The bracket device of claim 4, wherein the overlapping, circular openings have a diameter approximately equal to the mounting leg apertures.

6. The bracket device of claim 1, wherein the two coupling legs have an end that is rounded.

7. The bracket device of claim 1, wherein the coupling segment and the mounting segment are attached to the connecting member.

8. The bracket device of claim 1, wherein at least one of the coupling segment and the mounting segment is integrally formed with the connecting member.

9. The bracket device of claim 1, wherein the coupling segment and the mounting segment are integrally formed with the connecting member.

10. The bracket device of claim I, wherein the bracket device further includes a wheel positioned between and coupled to the two coupling legs.

11. The bracket device of claim 1, wherein the bracket device further includes a wheel positioned between and coupled to the two mounting legs.

12. A system, comprising:
    a first support member having at least one aperture;
    a second support member having at least one aperture; and
    a bracket device for attaching the second support member to the first support member, the bracket device comprising:
      a double U-shaped bracket including a connecting member having four legs wherein
      a first leg and a second kg are arranged to be secured to side faces of the first support member using an attachment member for connection of the double-U shaped bracket and the first support member at the aperture provided on the first support member and a first leg opening and a second leg opening; and
      a third leg and a fourth leg are arranged to be secured to side faces of the second support member using an attachment member for connection of the double U-shaped bracket and the second support member at the aperture provided on the second support member and a third leg opening and a fourth leg opening, wherein the third leg has a slit at a junction between the connecting member and the third leg, the slit configured for interlocking with a leg slit of a different connecting member.

13. The system of claim 12, wherein the second support member is attached to the bracket device so that the second support member can extend approximately parallel relative to the first support member.

14. The system of claim 12, wherein the second support member is attached to the bracket device so that the second support member can extend approximately perpendicular relative to the first support member and be supported thereby.

15. The system of claim 12, wherein the first leg and second leg are secured to opposite side faces of the first support member, and the third leg and fourth leg are secured to opposite side faces of the second support member.

16. The system of claim 12, wherein the system includes an inverted double U-shaped bracket, wherein the third leg and the fourth leg of the inverted double U-shaped bracket are arranged to be secured to opposite side faces of the second support member and wherein the third leg slit of the inverted double U-shaped bracket is arranged to be interlocked with the third leg slit of the double U-shaped bracket.

17. The system of claim 16, wherein the connecting member has a connecting aperture in the center of the connecting member, and the bracket device further includes the connecting member secured to the first support member using an attachment member for connection of the double U-shaped bracket and the first support member at the aperture provided on the first support member and the connecting aperture.

18. The system of claim 12, wherein the slit extends from an end of the junction between the connecting member and the third leg to approximately a middle of the junction between the connecting member and the third leg.

19. The system of claim 18, wherein the fourth leg has a slit at a junction between the connecting member and the fourth leg.

20. A system, comprising:
a first support member having at least one aperture;
a second support member having at least one aperture; and
a bracket device for attaching the second support member to the first support member so that the second support member can extend approximately perpendicularly relative to the first support member and be supported thereby, the bracket device comprising:
    a double U-shaped bracket comprising a connection member having four legs;
    a first leg and a second leg arranged to be secured to opposite side faces of the first support member using an attachment member for connection of the double-U shaped bracket and the first support member at the aperture provided on the first support member and a first leg opening and a second leg opening; and
    a third leg and a fourth leg arranged to be secured to opposite side faces adjacent an end of the second support member using an attachment member for connection of the double U-shaped bracket and the second support member at the aperture provided on the second support member and a third leg opening and a fourth leg opening; and
    wherein the third leg includes a slit configured for interlocking with a leg slit of a different connecting member.

21. The system of claim 20, wherein the first support member has a first profile and the second support member has a second profile.

22. The system of claim 21, wherein the first and second legs of the double U-shaped bracket have a distance between the first and second legs to conform to the first profile of the first support member.

23. The system of claim 21, wherein the third and fourth legs of the double U-shaped bracket have a distance between the third and fourth legs to conform to the second profile of the second support member.

24. The system of claim 20, wherein a first U-shaped bracket including the first leg and second leg and a second U-shaped bracket including the third leg and fourth leg are joined to form the connection member having four legs.

25. A bracket device, comprising:
a coupling segment having two coupling legs for connecting to a first support member; and
a mounting segment having two mounting legs for connecting to a second support member, wherein the mounting legs are arranged to be oriented in an opposite direction relative the coupling legs when attached to the second support member, the mounting legs perpendicular in one axial dimension to the coupling legs, and wherein a mounting leg has a slit at a junction between a connecting member positioned between the coupling segment and the mounting segment and the mounting leg, the slit configured for interlocking with a leg slit of a different mounting segment;
wherein the slit extends from a top of the junction between the connecting member and the mounting leg to approximately a middle of the junction between the connecting member and the mounting leg.

26. The bracket device of claim 25, wherein the two coupling legs each have a coupling leg opening aligned across the connecting member.

27. The bracket device of claim 26, wherein the coupling leg opening is a series of overlapping, circular openings.

28. The bracket device of claim 27, wherein the mounting legs extend from the connecting member and each mounting leg defines a mounting leg aperture aligned across the connecting member.

29. The bracket device of claim 28, wherein the overlapping, circular openings have a diameter approximately equal to the mounting leg apertures.

30. The bracket device of claim 25, wherein the two coupling legs have an end that is rounded.

31. The bracket device of claim 25, wherein the coupling segment and the mounting segment are attached to the connecting member.

32. The bracket device of claim 25, wherein at least one of the coupling segment and the mounting segment is integrally formed with the connecting member.

33. The bracket device of claim 25, wherein the coupling segment and the mounting segment are integrally formed with the connecting member.

* * * * *